(12) United States Patent
Satou et al.

(10) Patent No.: US 7,933,174 B2
(45) Date of Patent: Apr. 26, 2011

(54) OPTICAL PICKUP WITH SUPPORT PART HAVING HOLE FOR BEING INSERTED WITH A PROJECTION PART OF A CASE

(75) Inventors: Yoshihiro Satou, Hitachinaka (JP);
Katsuhiko Kimura, Kasumigaura (JP);
Tetsuo Itou, Yokohama (JP); Souichirou Yamada, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 160 days.

(21) Appl. No.: 12/265,750

(22) Filed: Nov. 6, 2008

(65) Prior Publication Data
US 2009/0116345 A1    May 7, 2009

(30) Foreign Application Priority Data
Nov. 7, 2007 (JP) .................... 2007-289126

(51) Int. Cl.
*G11B 7/00* (2006.01)
(52) U.S. Cl. ..................... 369/44.15; 720/684
(58) Field of Classification Search .......... 369/44.11, 369/44.14–44.22; 720/681–687
See application file for complete search history.

(56) References Cited

U.S. PATENT DOCUMENTS

| | | | | |
|---|---|---|---|---|
| 5,541,899 A | * | 7/1996 | Kume et al. | 369/44.14 |
| 6,163,416 A | * | 12/2000 | Uekusa et al. | 369/44.15 |
| 6,633,519 B2 | * | 10/2003 | Park et al. | 369/44.15 |
| 2007/0121435 A1 | * | 5/2007 | Nagasato et al. | 369/44.16 |

FOREIGN PATENT DOCUMENTS
JP     2002-074704     3/2002
* cited by examiner

*Primary Examiner* — Thang V Tran
*Assistant Examiner* — Nathan A Danielsen
(74) *Attorney, Agent, or Firm* — Antonelli, Terry, Stout & Kraus, LLP.

(57) ABSTRACT

An objective lens actuator in an optical pickup, having a semiconductor laser diode, electro-optic parts, such as a lens or the like, as well as, the objective lens actuator, etc., in a case, comprises: a holder, which mounts an objective lens and a coil thereon, as being a movable part; a magnetic circuit part, which is made up with a magnet for magnetically driving said holder and a yoke; a plural number of elastic support parts which elastically supports said holder; and a support part, which supports other ends of said elastic support parts, wherein said support part has a part, which is cut open in parallel with the elastic support parts, between said elastic support parts, and has a through hole, in which said elastic support part passes through for each of said elastic support parts, and thereby to provide the objective lens actuator for lowering the unwanted vibration mode of the objective lens, and also enabling a stable control thereof.

3 Claims, 6 Drawing Sheets

TRACKING DIRECTION      YAWING DIRECTION

OPTICAL PICKUP WITH SUPPORT PART HAVING HOLE FOR BEING INSERTED WITH A PROJECTION PART OF A CASE

BACKGROUND OF THE INVENTION

The present invention relates to an objective lens actuator of an optical pickup, for conducting reading/writing from/onto a disc within an optical disc apparatus, etc., and it further relates to an optical pickup and also an optical disc apparatus comprising the objective lens actuator therein.

In recent years, with an optical disc apparatus is achieved speed-up of the data transfer rate through high-density thereof, and this is remarkable, in particular, in a field of an optical disc apparatus of a thin-type, i.e., being called "a slim type". It is the optical pickup that conducts data recording/reproducing within the optical disc apparatus. Thus, within the optical pickup, the objective lens actuator is a device for driving an objective lens for condensing or focusing lights on a recording surface of the optical disc, in the focusing direction (i.e., directions for approaching/separating to/from an optical disc surface), the tracking direction (i.e., a radial direction of the optical disc) and the radial-tilt direction (i.e., tilting into the radial direction of the optical disc). Also, that mounting the objective lens actuator thereon, so as to enable reading/writing from/onto the optical disc is the optical pickup.

A movable part support arrangement, being made up with an objective lens of this objective lens actuator and a holder equipped with a coil, is such that plural numbers of elastic supporting members, i.e., wires are disposed, being supported on a movable part at one end while being fixed or supported on a support end at the other end thereof, thereby to build up parallel links.

When achieving the high speeding of the data transfer rate, there is a necessity of bringing an unwanted resonance of the objective lens actuator to be latescent. As a method for the present problem, within the following Patent Document 1, a wire support member is divided, so as to let wire support parts to have the elasticity, thereby bringing the unwanted resonance of the objective lens actuator to be latescent.

[Patent Document 1] Japanese Patent Laying-Open No. 2002-74704 (2002) (FIG. 1).

BRIEF SUMMARY OF THE INVENTION

With the conventional art mentioned above, there are two (2) pieces of the wire through holes in the wire support member, i.e., there are the wire support parts and the wire through holes. The wire through hole lies in between the fire support part at the lens holder and the wire support part at said fire support member. A diameter of the wire through hole is formed to be larger than the wire diameter. For that reason, when the lens shifts in the focus direction or the track direction, there is a possibility that the wire touches the wire through hole. The elasticity originally owned by the wire is made between a distance from the wire support part at the lens holder and the wire support part at the wire support member mentioned above, but if such phenomenon as was mentioned before occurs, then an abrupt change is generated in the wire elasticity, and this brings about a trouble in control of the objective lens actuator.

An object is, according to the present invention, to provide an optical pickup for achieving high speeding of the data transfer rate, with stability, while effectively bringing the unwanted resonance of the objective lens actuator to be latescent, and thereby providing an optical disc apparatus.

For accomplishing the object mentioned above, according to the present invention, there is provided a The object mentioned above is accomplished, according to the present invention, by an objective lens actuator in an optical pickup, having a semiconductor laser diode, electro-optic parts, such as a lens or the like, as well as, the objective lens actuator, etc., in a case, comprising: a holder, which mounts an objective lens and a coil thereon, as being a movable part; a magnetic circuit part, which is made up with a magnet for magnetically driving said holder and a yoke; a plural number of elastic support parts which elastically supports said holder; and a support part, which supports other ends of said elastic support parts, wherein said support part has a part, which is cut open in parallel with the elastic support parts, between said elastic support parts, and has a through hole, in which said elastic support part passes through for each of said elastic support parts.

Also, the object mentioned above, according to the present invention, is accomplished by the objective lens actuator, as described in the above, wherein the cut-open part of said support part has a long side in an axial direction of said elastic support part.

Also, the object mentioned above, according to the present invention, is accomplished by the objective lens actuator, as described in the above, wherein a thin wall part is provided at the cut-open part of said support part.

Also, the object mentioned above, according to the present invention, is accomplished by the objective lens actuator, as described in the above, wherein said objective lens actuator is mounted on said optical pickup.

Further, the object mentioned above, according to the present invention, is accomplished by an optical pickup, comprising: a semiconductor laser diode; electro-optic parts, such as a lens or the like; and an objective lens actuator, etc., in a case, wherein said objective lens actuator comprises: a holder, which mounts an objective lens and a coil thereon, as being a movable part; a magnetic circuit part, which is made up with a magnet for magnetically driving said holder and a yoke; a plural number of elastic support parts which elastically supports said holder; and a support part, which supports other ends of said elastic support parts, wherein said support part has a part, which is cut open in parallel with the elastic support parts, between said elastic support parts, and has a through hole, in which said elastic support part passes through for each of said elastic support parts, and a hole is provided on said support part, so as to be inserted with a projection part, which is provided on said case.

Also, the object mentioned above, according to the present invention, is accomplished by the optical pickup as described in the above, wherein the cut-open part of said support part has a long side in an axial direction of said elastic support part.

Also, the object mentioned above, according to the present invention, is accomplished by the optical pickup as described in the above, wherein a thin wall part is provided at the cut-open part of said support part.

According to the present invention mentioned above, it is possible to provide an optical pickup for achieving high speeding of the data transfer rate, with stability, while effectively bringing the unwanted resonance of the objective lens actuator to be latescent, and thereby providing an optical disc apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Embodiment 1

Explanation will be made on a first embodiment according to the present invention, by referring to FIGS. 1, 2, 3, 4 and 7.

Figure 1:
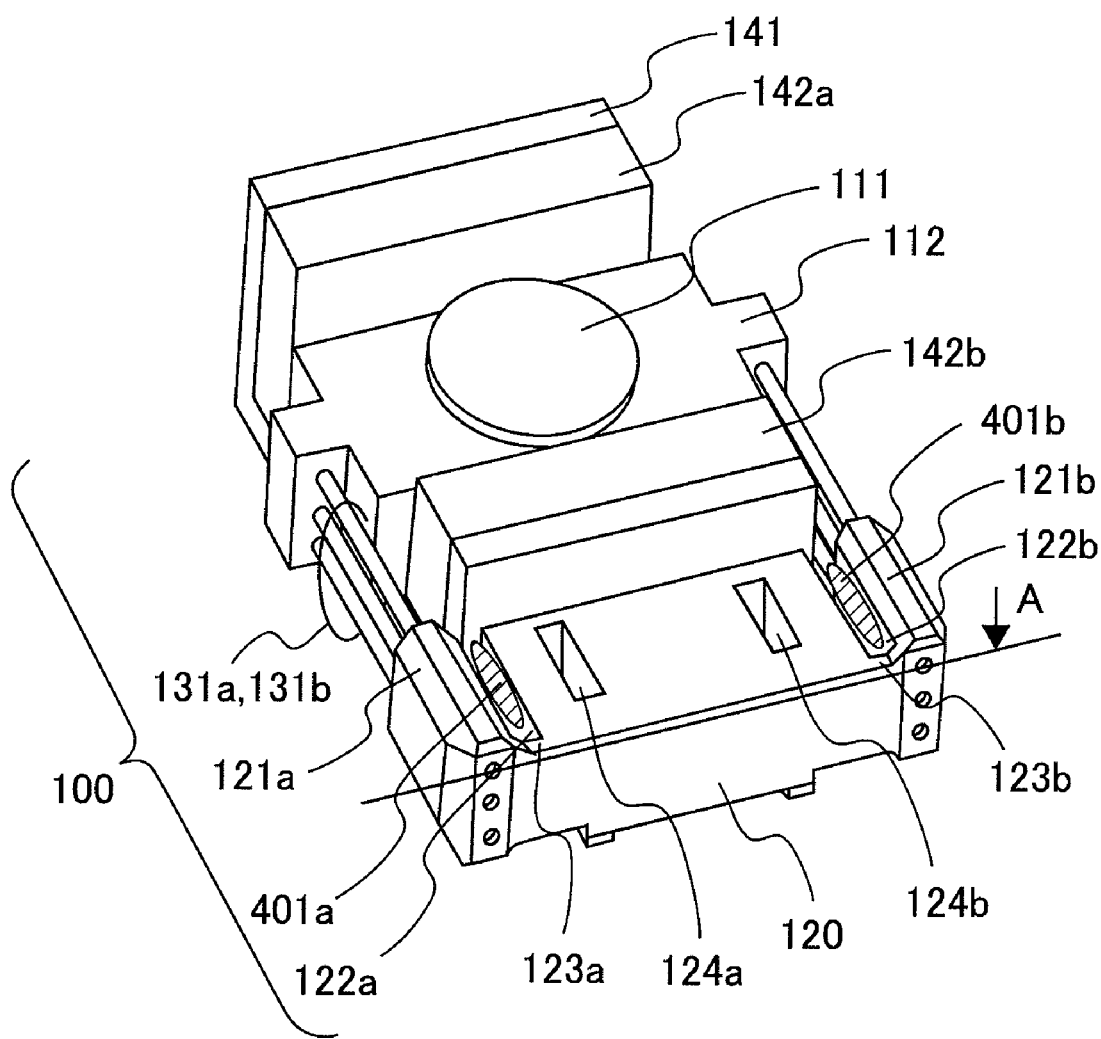
FIG. 1 is a view for showing a first embodiment according to the present invention.
Figure 1:
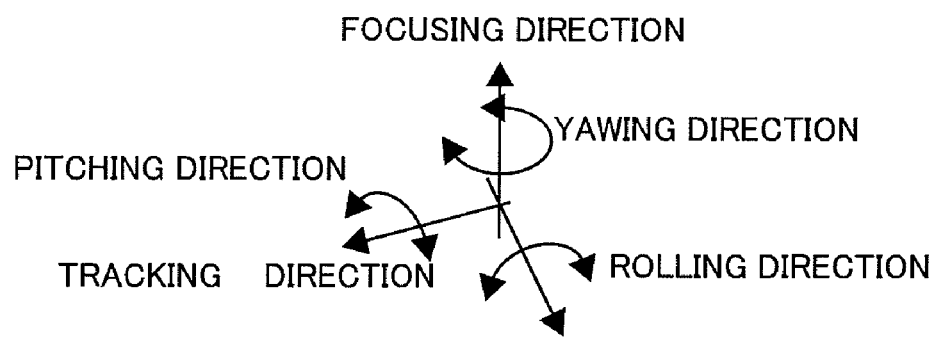

FIG. 1 is an outlook view for showing an objective lens actuator, according to the present embodiment.

Figure 2:
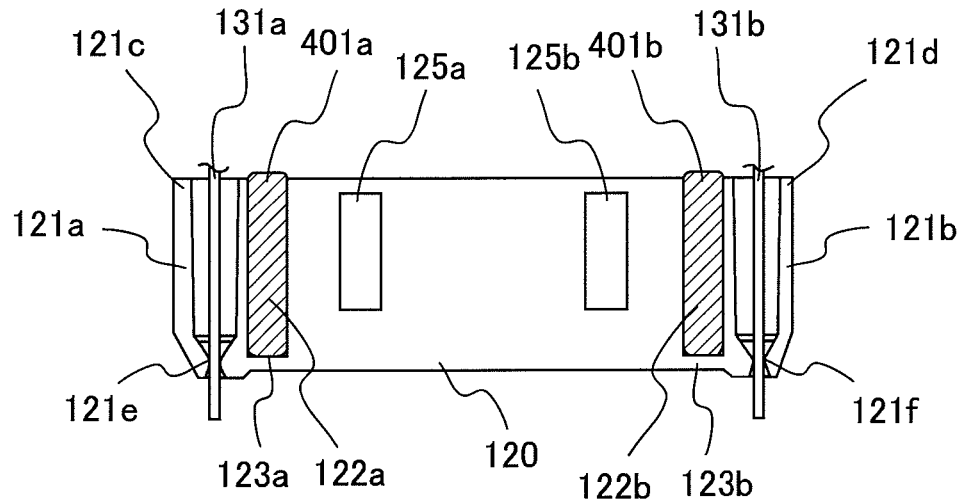
FIG. 2 is a cross-section view in the vicinity of a wire support part within the first embodiment according to the present invention.

FIG. 2 is a A-A cross-section view in FIG. 1, for showing the vicinity of an elastic support member support part, according to the present embodiment.

Figure 3:
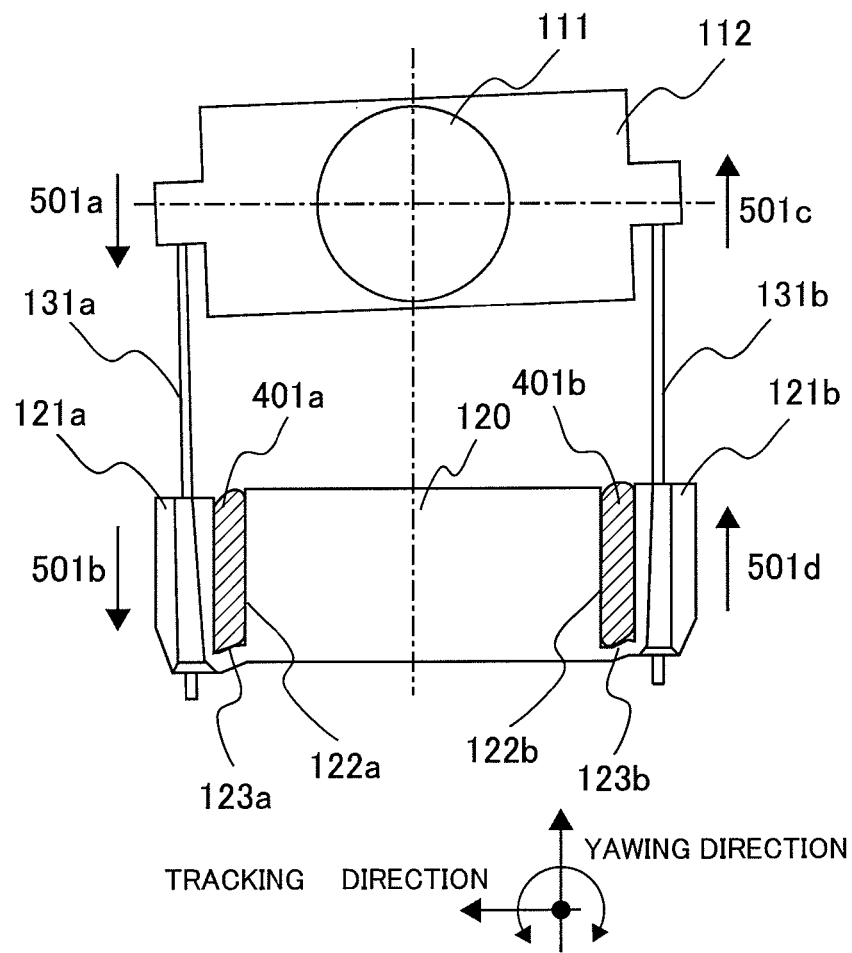
FIG. 3 is a view for explaining a yawing vibration within the first embodiment according to the present invention.

FIG. 3 is a view for showing the operations when a yawing vibration is generated, according to the present embodiment.

Figure 4:
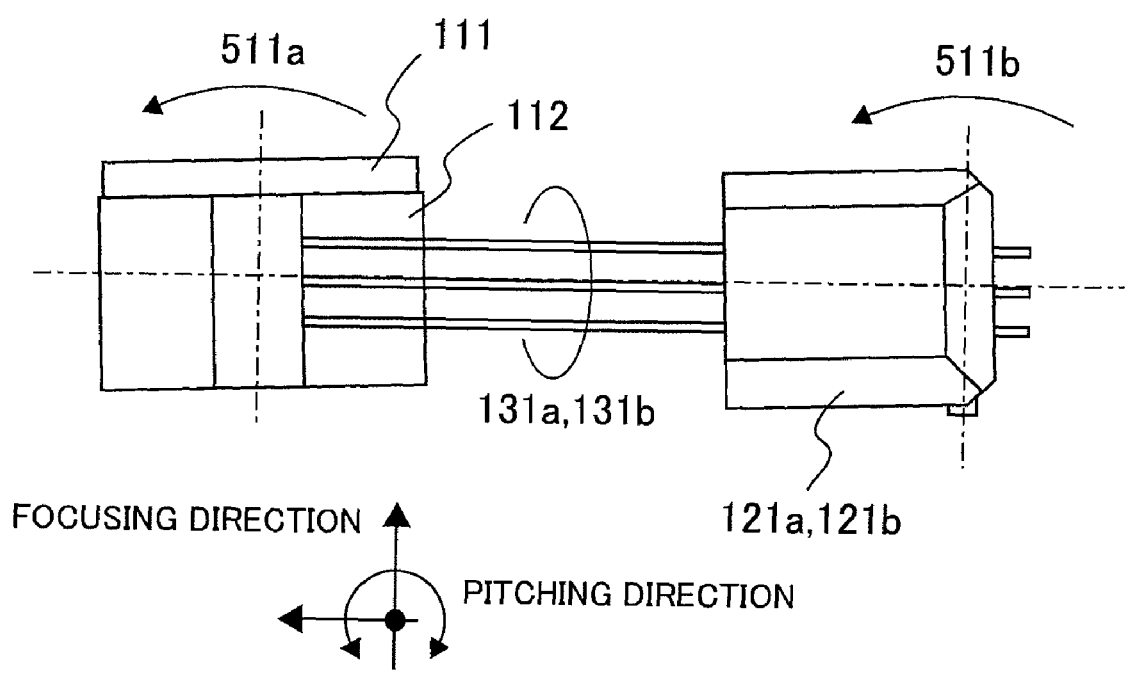
FIG. 4 is a view for explaining a pitching vibration within the first embodiment according to the present invention.

FIG. 4 is a view for showing the operations when a pitching vibration is generated, according to the present embodiment.

Figure 7:
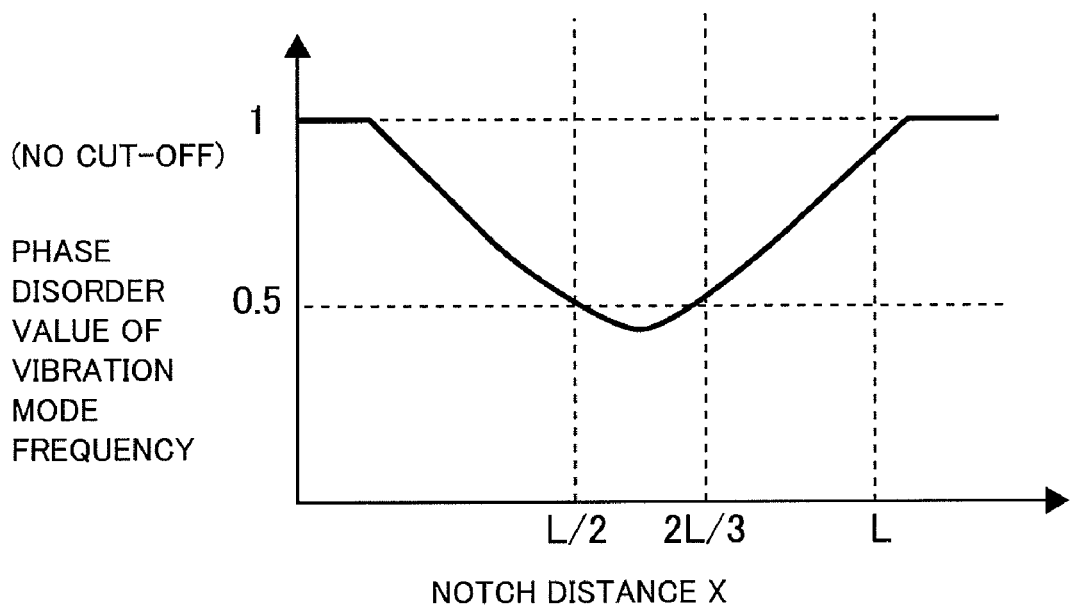
FIG. 7 is a graph for showing a relationship between a notch distance and a phase disorder value at vibration mode frequency, such as, the yawing vibration, etc.

FIG. 7 is a graph for showing a relationship between a notch distance of the elastic support member support part and a phase disorder value of a yawing vibration.

The characteristic of the present embodiment lies in that a cutting area of a square shape is provided along with an axial direction of an elastic support member, within a member for fixing or supporting the other end of the elastic support member for elastically supporting a lens holder. Since a straight wire is used as the elastic support member in the present embodiment, then the elastic support member will be expressed by "wire", hereinafter. Also, other than the wire, it is possible to apply a leaf spring in the place thereof.

Hereinafter, explanation will be made on the structures of the present embodiment.

In the figure, an objective lens 111 is attached on a lens holder 112. The lens holder 112 is elastically supported on a wire support part 120 through wires 131a and 131b, to be movable. In this manner, the objective lens 111 can focus a laser light on a disc not shown in the figure. The lens holder 112 can move or displace in the movable directions, i.e., the focus, tracking and radial tilt directions, largely, but as will be mentioned later, a part of the wire support part 120 connecting with the wire can also move or displace in a pitching direction and a yawing direction as shown in FIG. 1, through the elasticity of thin-place parts 123a and 123b. Within wire passing parts 121a and 121b of the wire support part 120 are formed spaces 121c and 121d so that wires 131a and 131b are not contact with the wire passing parts 121a and 121b. Further, within that space may be filled up with a vibration damping material, for the purpose of accelerating vibration dumping. Also, into the parts 122a and 122b, which are cut off in the square shape, may be filled up with vibration damping materials 401a and 401b for the wires 131a and 131b. Preferably, the vibration damping material may be a silicon gel or a rubber, etc., for example.

Driving of the lens holder 112, so as to focus the laser light on the disc, will be conducted through an electromagnetic action between a coil, being mounted on the lens holder 112 shown in FIGS. 1 and 3, and magnets 142a and 142b, which are disposed on the opposite surface thereof. The group of magnets, i.e., the magnets 142a and 142b are supported on a yoke 141, so as to hold it in the space and build up a magnetic circuit. Also, the lens holder 112, the wires 131a and 131b and a support part 120, building up the movable part, are rigidly connected with the yoke 141, with filling up with a connecting material, such as, an adhesive, etc., into cut-off parts 124a and 124b, which are on the opposite surface of the yoke 141 of the support part 120.

Next, explanation will be made on the structures of the wire support part 120, as being a characteristic of the present embodiment.

The wire support part 120 shown in FIGS. 2 and 3 is a support part for the lens holder 112 mounting the lens 111 thereon, as the movable part, and for the other ends of the wires 131a and 131b for supporting thereof. With this, the wire support part 120 has also a function of connecting with the optical pickup case, which is not shown in the figures. The wire support part 120 has through holes 121e and 121f, for passing the wire therethrough, etc., and with those through holes 121e and 121f, etc., the wires 131a and 131b are supported or fixed, through a fixing or supporting member or material, such as, the adhesive, etc.

The wires 131a and 131b are supported or fixed on the wire support part 120, with keeping a distance therebetween, and have open parts 122a and 122b between both, each being cut long in an axial direction of the wire 131a or 131b. For that reason, there are also thin wall parts 123a and 123b in the wire support part 120, i.e., parts remaining in the wire axial direction, other than the cut-open parts 122a and 122b. With those thin wall parts 123a and 123b, a configuration of a cantilever is made up, having a fixed end at a central side of the wire support part 120 and free ends at the wire passing parts 121a and 121b on outer sides, in the vicinity of the support or fixing of the wire 131a or 131b with the wire support part 120. With this structure, a main displacement direction is in the axial direction of the wires 131a and 131b, but since the thin wall parts 123a and 123b are in the plate-like shape, then torsions are also generated therein. With this fact, the wire passing part 121a or 121b conducts a circular action around the vicinity of the thin wall part 123a or 123b in the focusing direction.

Next, explanation will be made on the functions of the first embodiment of the present invention, by referring to FIGS. 2, 3 and 4.

In case when magnetic driving force is applied on the lens holder 112 in the focusing and tracking directions, etc., a rigid vibration mode of the lens holder 112 is generated at a certain frequency, with using the wires 131a and 131b as springs. This vibration mode is in the translation mode and the rotation mode. Among of those, the mode of rotating around the axis of the focusing direction is a yawing vibration, and the mode of rotating around the axis of the tracking direction is a pitching vibration. In more details, a displacement mode shown in FIG. 3 is the yawing vibration, and the mode shown in FIG. 4 is the pitching vibration. In the present embodiment, those modes can be reduced through the wire support part 120. First of all, explanation will be made on the reducing vibration action of the yawing vibration, by referring to FIG. 3.

As is shown in FIG. 3, when the yawing vibration is generated on the lens holder 112, a vibration is generated on the lens holder 112 as a rotary motion, but for the wires 131a and 131b supporting the lens holder 112, since it is converted into the vibration in the axial direction of the wire, then the wires 131a and 131b try to displace into the directions as shown by arrows 501a, 501b, 501c and 501d on both sides in the figure. Because the direction of displacement due to the vibration is periodical, although there are cases where they are opposite to the arrows 501a, 501b, 501c and 501d shown in FIG. 3, but explanation will be given on the case of the direction of displacement due to the vibration shown in FIG. 3, in the present explanation.

In case of the vibration direction as shown in FIG. 3, a compression force is applied onto the wire 131a while an extensional force on the wire 131b, as axial forces. Those axial forces push a part 121e and pull a part 121f, which support or fix the wires 131a and 131b of the wire support part 120, through the wires 131a and 131b.

On the other hand, although the parts 121e and 121f supporting or fixing the wires 131a and 131b are part of the wire support part 120, but since they are connected with a central portion through the thin wall parts 123a and 123b, they have spring characters at the present parts. Accordingly, due to the axial forces of the wires generated at the parts 121e and 121f, which support the wires 131a and 131b, the wire passing parts 121a and 121b displace into the axial direction of the wire due to the springs of the thin wall parts 123a and 123b.

With this, consumption is made on the vibration energy in the thin wall parts 123a and 123b, and thereby achieving reduction of the yawing vibration of the lens holder 112. Further, in case where the vibration damping materials 401a and 401b are in the cut-open parts 122a and 122b, then a relative displacement is generated between the side wall of the wire support part 120 and the side walls of the wire passing parts 121a and 121b, and at the same time are deformed the vibration damping materials 401a and 401b, which are filled up within the cut-open parts 122a and 122b. In this instance, consumption of the vibration energy is done within the vibration damping materials 401a and 401b, and as a result thereof, reduction of vibration is generated in the vibration mode, and therefore it is possible to suppress the yawing vibration, effectively.

With the size of the cut-open part of the wire support part, if assuming that the distance is "L" from the center of the wire support part 120 to the wire passing hole 121e or 121f, and that the width is "x" of the cut-open parts 122a and 122b, then plotting of the phase disorder values of vibration mode frequency is as shown in FIG. 7. Since stability can be obtained on a control system by setting a target value of the phase disorder value to be about ½ of the phase disorder value under the condition of no cut-open part, then it is enough to set the target value to be ½ thereof. For setting the phase disorder value to be ½ of that under the condition of no cut-open part, it preferable that the width "x" of the parts 122a and 122b lies in a range from ½ to ⅔ of the distance "L" from the center of the wire support part 120 to the wire passing hole 121e or 121f.

The reason of using the phase disorder value as an index lies in that, although the objective lens actuator conducts the translation driving, normally, and is controlled while waiting for a result of measurement in same direction to the driving direction, but the rotational vibration modes of the yawing vibration and the pitching vibration hardly appear on the displacement. However, it is because they clearly appear, as a disturbance of the phases. In the similar manner, the rotational vibration modes also cause phase disturbances onto the control system, thereby giving ill influences upon a stable control. Also, in the pitching vibration, it is possible to suppress the vibration, effectively, with the function similar to that mentioned above.

As was mentioned above, according to the present embodiment, the rotational vibration modes of the lens holder, in particular, the yawing vibration mode and the pitching vibration mode are attenuated or dumped, effectively, in the vibrations thereof, and therefore it is possible to obtain an objective lens actuator for smoothing the vibration characteristics of the objective lens to be mounted on the lens holder. With applying the objective lens actuator according to the present embodiment into an optical pickup, since it is possible to further stabilize the control characterization, and therefore, it is possible to conduct the recording/reproducing onto/from the optical disc, with high accuracy, thereby obtaining an optical pickup having high reliability thereof.

However, though the cut-off of the wire support part for the vibration damping is presented by a square in the present embodiment, but the object thereof can be achieved, by keeping an enough distance in the tracking direction of the thin wall part, functioning as the spring, and also by forming it in "L"-like shape with respect to the yawing vibration, so as to hold the damping material therein.

Embodiment 2

Figure 5:
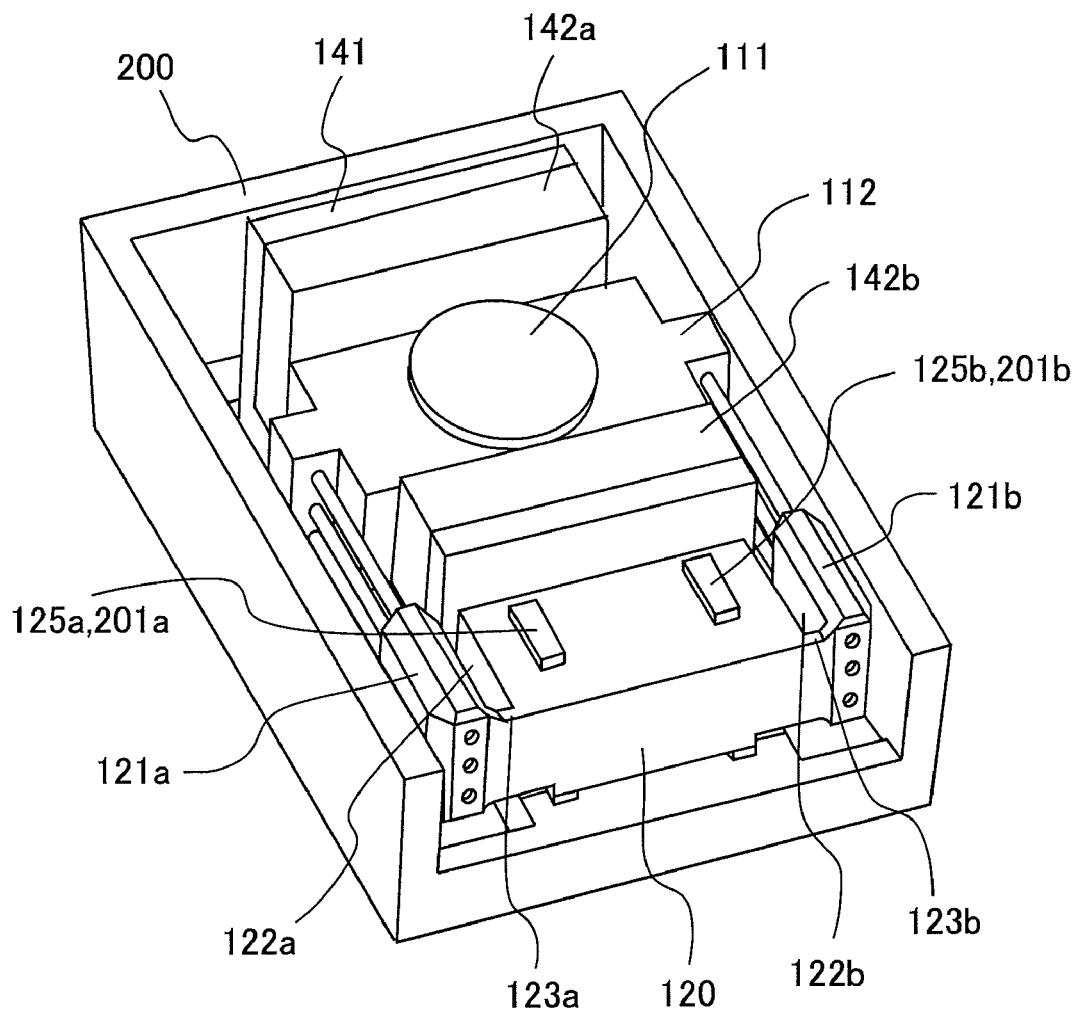
FIG. 5 is a view for showing a second embodiment according to the present invention.
Figure 5:
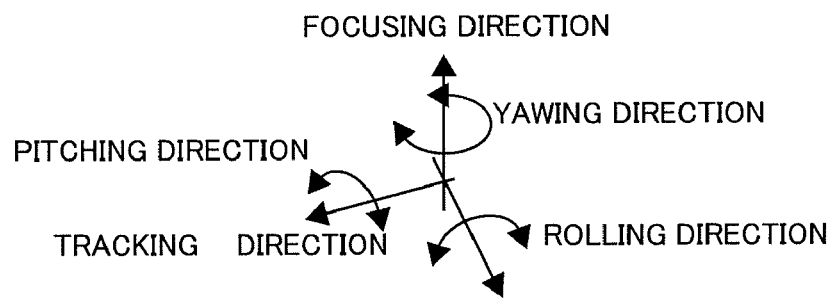

FIG. 5 is a drawing for showing an outlook of mounting the objective lens actuator according to the present embodiment onto an optical pickup case.

The feature of the present embodiment lies in that a projection part formed on the optical pickup is inserted into a hole, which is provided on the objective lens actuator.

Hereinafter, the structures of the present embodiment will be shown.

In FIG. 5, the objective lens 111 is attached on the lens holder 112. The lens holder 112 is elastically supported on the wire support part 120, through the wires 131a and 131b, as the elastic support members, and is movable.

In this manner, the objective lens 111 can focus the laser light onto the disc not shown in the figure. The lens holder 112 can move or displace in the movable directions, i.e., the focus, tracking and radial tilt directions, largely, but as will be mentioned later, a part of the wire support part 120 connecting with the wire can also move or displace in the pitching direction and the yawing direction as shown in FIG. 1, through the elasticity of thin-place parts 123a and 123b. Within wire passing parts 121a and 121b of the wire support part 120 are formed spaces 121c and 121d so that wires 131a and 131b are not contact with the wire passing parts 121a and 121b. Further, within that space may be filled up with a vibration damping material, for the purpose of accelerating vibration dumping. Also, with the reason same to the above, into the parts 122a and 122b, which are cut off in the square shape, may be filled up with vibration damping materials 401a and 401b, as shown in FIGS. 1, 2 and 3. Preferably, as the vibration damping material may be appropriate the silicon gel or the rubber, etc. The driving of the lens holder 112 for focusing the laser onto the disc is similar to the functions shown in the embodiment 1.

Next, explanation will be made on the structures of the wire support part, as being the feature of the present embodiment. Although the functions of attenuating or damping the vibration, i.e., the yawing vibration or the pitching vibration, at the wire support part 120 is similar to that shown in the embodiment mentioned above, but on the present wire support part 120 are provided connection holes 125a and 125b for connecting with the optical pickup case 200.

Next, explanation will be made on the functions of the present embodiment.

The basic vibration damping of the yawing vibration or the pitching vibration, which is generated on the lens holder 112, is same to that of the embodiment 1, but there are cases where the vibration cannot be damped down to a desired vibration amount or magnitude when the vibration magnitude is excessive or large too much. In this instance, the vibration is transmitted to connection parts 201a and 201b connecting with the optical pickup case 200, through the thin wall parts 123a and 123b and the wire support part 120, and thereby vibrating the lens holder 112, in the structures thereof. Since the optical pickup case 200 is as several tens times large as a mass of the lens holder 112, even if all of the vibration energy generated on the lens holder 112 is transmitted to the optical pickup case, no influence is caused on the optical pickup case as a whole. In this manner, the vibration generated on the lens holder 112 is damped at the wire support part 120, and further it is transmitted to the optical pickup case 200, with decreasing the vibration thereof; therefore, it is possible to lower or reduce the vibration even if a large vibration is generated on the lens holder 112.

As was explained in the above, since it is possible to attenuate or damp the vibration, accurately, if the excessive vibration is generated on the lens holder in the present embodiment, and therefore it is possible to obtain the objective lens actuator of being preferable in the vibration characteristics thereof. Also, since mounting the objective lens actuator, according to the present embodiment, onto the optical pickup enables to obtain the stability of the control characterization of the objective lens, then it is possible to conduct the recording/reproducing onto/from the optical disc, with high accuracy, and thereby obtaining an optical pickup having a high reliability thereof.

However, though the cut-off of the wire support part is presented by the square, for the purpose of attenuating or damping the vibration, in the present embodiment, but the object thereof can be achieved by keeping an enough distance in the width direction of the thin wall part, functioning as the spring portion, and also by forming it in "L"-like shape, so as to hold the damping material therein.

Embodiment 3

Explanation will be made on a third embodiment of the present invention, by referring to FIG. 6.

Figure 6:
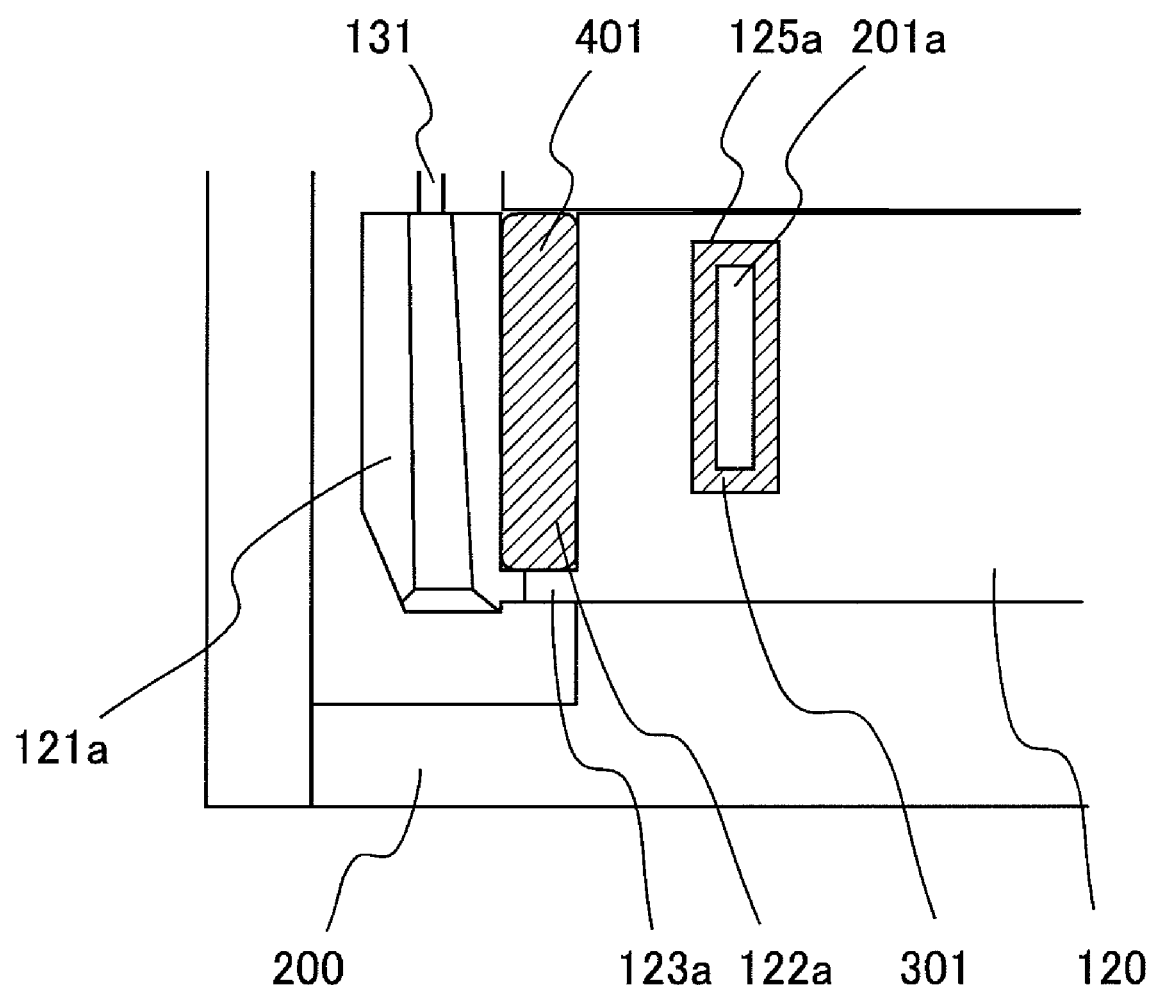
FIG. 6 is an enlarged view in the vicinity of an optical pickup case and the wire support part, for explaining a third embodiment according to the present invention.

FIG. 6 is a view for showing the connection part between the wire support part and the optical pickup case, enlargedly.

The feature of the present embodiment lies in that an adhesive having attenuation or damping function is disposed at the connection part between the wire support part and the optical pickup case according to the embodiment 2.

Explanation will be made on the present embodiment by referring to FIG. 6.

In FIG. 6, the connection part between the wire support part 120 and the optical pickup case 200 is connected by an insertion hole 125a, which is provided on the wire support part 120, and a projection part 201a, which is provided on the optical pickup case 200. The size of the insertion hole 125a formed is determined to be small comparing to the projection part 201a. Accordingly, when connecting the wire support part 120 with the optical pickup case 200, there is produced a gap between the insertion hole 125a and the projection part 201a.

In this gap is provided an adhesive having the damping function, as a second damping part. Other structures than that are same to those of the second embodiment. With adopting such the structures as mentioned above, the vibration generated on the lens holder and transmitted to the wire support part 120 as the whole, not yet attenuated or damped at the first damping part, i.e., the part made up with the thin wall part 123a and the wire passing part 121a of the wire support part 120, is damped at a second damping part, i.e., the connection part between the wire support part 120 and the optical pickup case 200, and thereby enabling to lower or reduce the vibration, with stability.

As was mentioned above, if generating the excessive vibration on the lens holder within the present embodiment, since it is possible to achieve the damping of the vibration, by means of the first vibration damping part and the second vibration damping part, therefore it is possible to obtain an objective lens actuator being preferable in the vibration characteristics thereof. Also since it is possible to stabilize the control characterization of the objective lens, by mounting the objective lens actuator according to the present embodiment onto the optical pickup, therefore the optical pickup can be obtained, having high reliability thereof.

Figure 8:
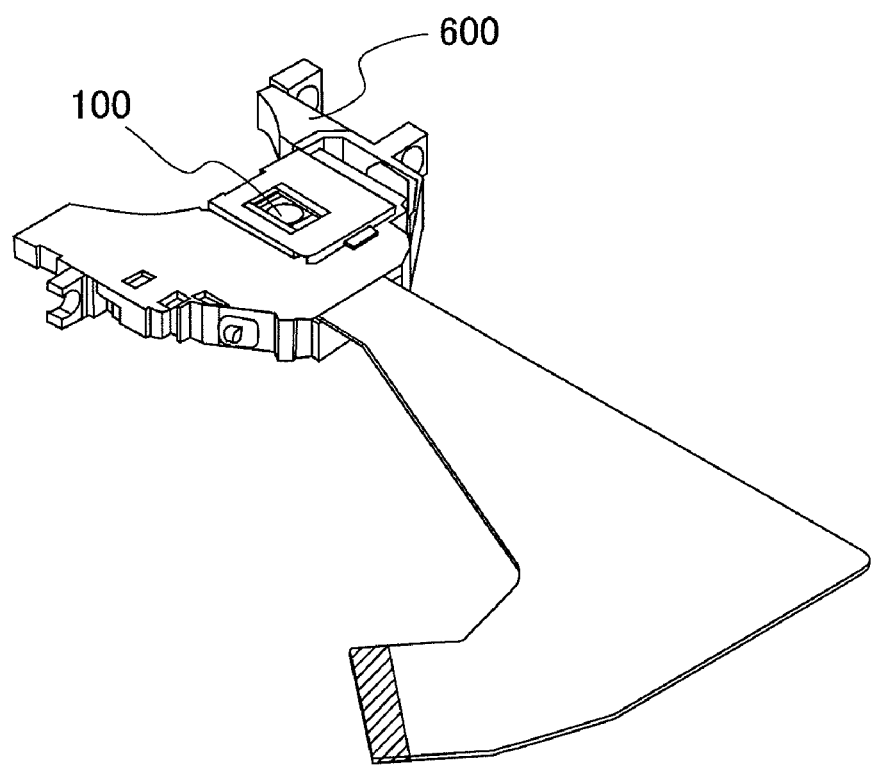
FIG. 8 is a view for showing an optical pickup mounting an objective lens actuator according to the present invention thereon.

Further, as is shown in FIG. 8, by mounting an objective lens actuator 100, according to the present invention, onto an optical pickup 600, it is possible to obtain thin-sizing of the optical pickup 600, as well as, the high reliability thereof.

As was mentioned above, according to the present invention, it is possible to provide an optical pickup for achieving high speeding of the data transfer rate, with stability, while effectively bringing the unwanted resonance of the objective lens actuator to be latescent, and thereby providing an optical disc apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical pickup, comprising:
  a semiconductor laser diode;
  electro-optic parts; and
  an objective lens actuator in a case, wherein
  said objective lens actuator comprises:
  a holder, which mounts an objective lens and a coil thereon, as being a movable part;
  a magnetic circuit part, which is made up with a magnet for magnetically driving said holder and a yoke;
  a plural number of elastic support parts which elastically supports said holder; and
  a support part, which supports other ends of said elastic support parts; wherein
  said support part has a part, which is cut open in parallel with the elastic support parts, between said elastic support parts, and has a through hole, in which said elastic support part passes through for each of said elastic support parts, and a hole is provided on said support part, so as to be inserted with a projection part, which is provided on said case; and
  said hole on said support part, which is to be inserted with said projection part of said case so as to establish a connection when said projection part is inserted, is larger than said projection part of said case, and a damper part is within a qap defined between said hole and said projection part.

2. The optical pickup, as described in the claim 1, wherein the cut-open part of said support part has a long side in an axial direction of said elastic support part.

3. The optical pickup, as described in the claim 1, wherein a thin wall part is provided at the cut-open part of said support part.

* * * * *